United States Patent [19]
Ruskin

[11] 3,796,097
[45] Mar. 12, 1974

[54] SPORTS SPEEDOMETER

[76] Inventor: Asa P. Ruskin, 865 West End Ave., New York, N.Y. 10462

[22] Filed: June 27, 1972

[21] Appl. No.: 266,667

[52] U.S. Cl. ................................................. 73/228
[51] Int. Cl. ............................................. G01f 1/06
[58] Field of Search ............ 73/186, 189, 228, 396, 73/492; 116/129 B

[56] References Cited
UNITED STATES PATENTS

| | | | |
|---|---|---|---|
| 2,889,707 | 6/1959 | Snider | 73/228 |
| 2,103,262 | 12/1937 | Knerr | 73/228 X |
| 3,564,917 | 2/1971 | Cronin et al. | 73/228 |
| 868,152 | 10/1907 | Atkinson | 73/228 |
| 3,380,302 | 4/1968 | Gelinas | 73/228 |
| 2,549,190 | 4/1951 | Gilchrist | 116/129 B |

FOREIGN PATENTS OR APPLICATIONS

| | | | |
|---|---|---|---|
| 25,321 | 2/1915 | Great Britain | 73/228 |
| 1,047,461 | 12/1954 | Germany | 73/228 |
| 522,149 | 3/1931 | Germany | 116/129 B |

Primary Examiner—Richard C. Queisser
Assistant Examiner—John P. Beauchamp
Attorney, Agent, or Firm—Kenneth S. Goldfarb

[57] ABSTRACT

An air-actuated speedometer for use in measuring the speed of a human body or vehicle comprising a housing having an opening for air intake and an opening for allowing air out of the housing. A plate is pivotally mounted in the housing and moves along an arc corresponding to an arcuate slot in the housing. Springs are provided for urging the plate to an initial position, the plate being initally spring held and counterbalanced to a zero speed position and movable by air passing through the housing to indicate the actual rate of speed. Frictionally engaging the housing and extending through the slot and adapted to be engaged by the slot is a device for indicating the highest speed attained during a predetermined period.

2 Claims, 8 Drawing Figures

PATENTED MAR 12 1974
3,796,097
SHEET 1 OF 2
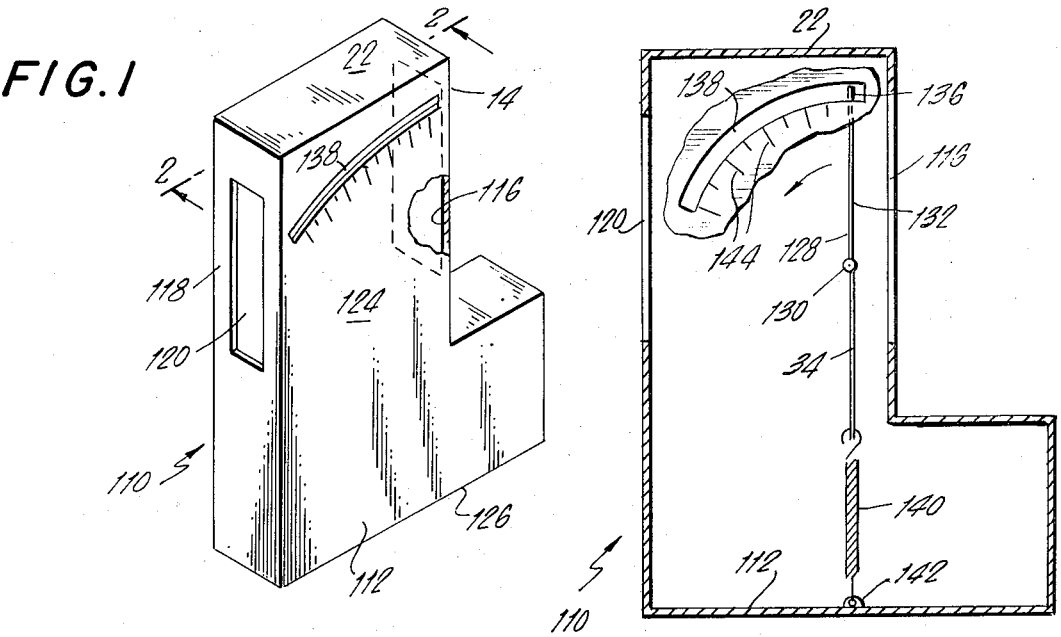
FIG.1
FIG.2
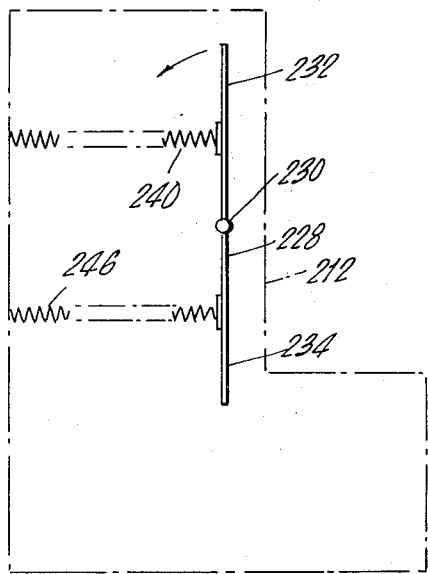
FIG.3
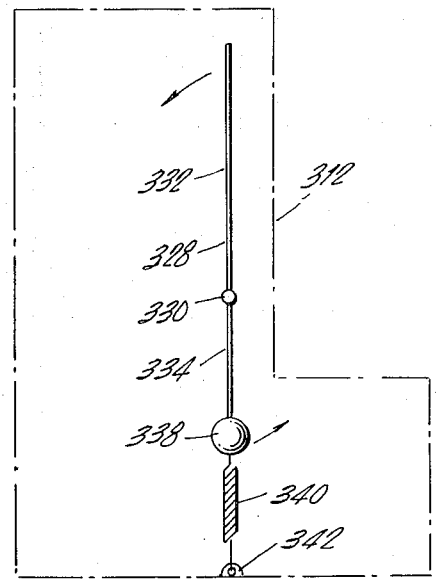
FIG.4

SPORTS SPEEDOMETER

CROSS REFERENCE TO RELATED APPLICATION

This application is related to U.S. Pat. No. 3,681,987 of Asa P. Ruskin, for "Air Actuated Ski Speedometer."

BACKGROUND OF THE INVENTION

1. Field of the Invention

The present invention relates to a sports speedomter for providing an indication to a sports participant or the operator of a vehicle of the instantaneous speed attained and of the highest speed attained during a predetermined period.

2. Description of the Prior Art

In the past various types of speedometers have been devised for providing an instantaneous indication of the speed of a sports participant such as a skier, racer, or the like. In the U.S. Pat. No. to Cronin et al., No. 3,654,917, there is disclosed a complicated air actuated speedometer which provides no means for indicating the highest speed which has been attained and employs a complicated arrangement of parts which, when mounted on the body of a sports participant, such as a skier or racer, will because of the force of gravity become imbalanced and not provide for correct readout of the speed.

SUMMARY OF THE INVENTION

The present invention overcomes the disadvantages of the prior art device by providing an inexpensive device which may be readily attached to the garment of a user in any convenient manner or may be secured on a vehicle in any desired location and which is so arranged that air passing into this speedometer actuates a counterbalance plate which moves along a radius about which the plate is pivoted to provide an indication because the plate is visible through an arcuate slot whereby an instantaneous indication of the speed attained is afforded. There is also associated with the housing and frictionally mounted thereon an indicator actuated with the housing and frictionally mounted thereon an indicator actuated by the plate and providing an indication of the highest speed attained until the indicator is reset.

Still further objects and features of this invention reside in the provision of an air actuated speedometer which is capable of being manufactured out of readily available materials in an inexpensive manner and which is highly efficient in use.

These, together with the various ancillary objects and features of this invention, which will become apparent as the following description proceeds, are attained by this sports speedometer, preferred embodiments of which are illustrated in the accompanying drawings, by way of example only, wherein:

BRIEF DESCRIPTION OF THE DRAWINGS

FIG. 1 is a perspective view of an embodiment of the speedometer constructed in accordance with the concepts of the present invention;

FIG. 2 is an enlarged vertical sectional view taken along the plane of line 2—2 in FIG. 1;

FIG. 3 is a schematic view of a modified form of the invention;

FIG. 4 is a schematic illustration of another embodiment of the invention;

DESCRIPTION OF THE PREFERRED EMBODIMENTS

Figure 5:
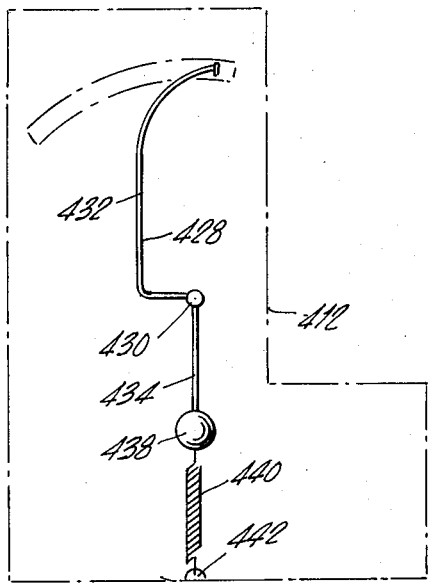
FIG. 5 is a schematic view showing an additional form of the invention.

With continuing reference to the accompanying drawings, wherein like reference numerals designate similar parts throughout the various views, reference numeral 110 is used to generally designate an air actuated speedometer constructed in accordance with the concepts of this invention. The speedometer 110 includes a housing 112 which is of a generally L-shape and includes a front wall 114 having an air-inlet opening 116 therein and a rear wall 118 having an outlet opening 120 therein. The housing is otherwise closed at the top 122 the sides 124 and along its bottom 126. A plate 128 is pivoted as at 130 at the center of gravity of the plate so that the plate 128 has an upper portion 132 counterbalanced by a lower portion 134. The upper portion 132 has an indicator tip or edge 136 which may be painted or colored in any desired manner and is visible through an arcuate slot 138 in the side 124. The slot is an arc taken at the radius at the location of the pivot 130. A coil spring 140 is secured to the lower portion 134 of the plate 128 and to an eye 142 attached to the housing 112.

In operation, air entering through the opening 116 is applied against the plate 128 and will pivot the plate along the arc 138 so that the location of the indicator 136 cooperating with the indicia 144 on the side 124 will provide a direct readout of the instantaneous speed attained at any time by the air passing through the speedometer 110. The speedometer 110 may be secured in any convenient manner to the garments of the user, may be held by the user, or attached to any suitable vehicle or like equipment, such as a speedboat, skimobile, sled, and the like.

In the embodiment shown in FIG. 3, the housing 212 is shown schematically and the plate 228 is pivoted at its center of gravity at 230. In lieu of the spring 140 which extends along the vertical axis of the plate 132, two springs 240 and 246 are employed, the spring 240 biasing the upper portion 232 of the plate 228 and the housing 212 while spring 246 biases the lower portion 234 of the plate 228 and the housing.

In the form of the invention shown in FIG. 4, the housing is indicated schematically at 312 and the plate 328 includes an upper portion 332 of larger size than the lower portion 334. However, the plate 328 is pivoted essentially at its center of gravity 330 because there is provided a counterweight 338 and to an eye 342.

In FIG. 5 the housing is indicated schematically at 412 and the plate 428 is pivoted at its center of gravity 430. The upper portion 432 of the plate is concave facing the inlet opening and the lower portion 434 is provided with a counterweight 438 to which the spring 440 is attached, the spring 440 also being secured to an eye 442 on the bottom of the housing.

Figure 6:
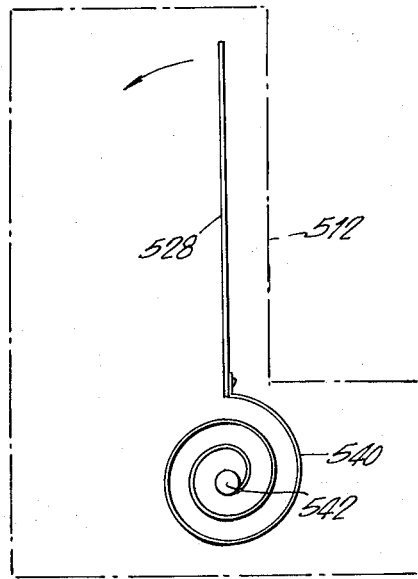
FIG. 6 is a schematic illustration of yet another modification of the invention.
Figure 7:
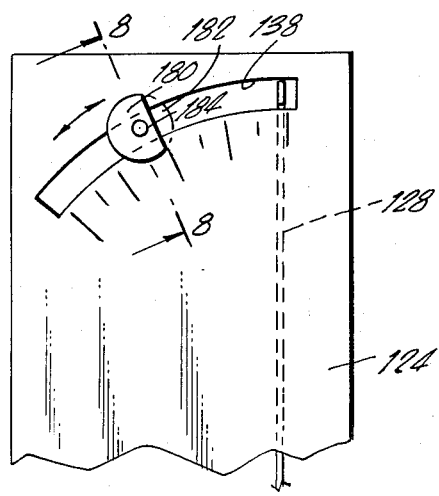
FIG. 7 is an elevational view of an indicator device.
Figure 8:
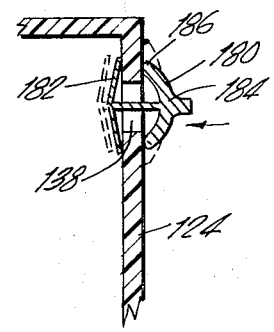
FIG. 8 is a sectional detail view taken along the plane of line 8—8 in FIG. 7.

The form of the invention indicated in FIG. 6 is useful when the speedometer is mounted in an aligned vertical position and includes a plate 528 to which a coil spring 540 is attached, the coil spring being attached to a stud 542 in the housing.

In order to provide for an indication of the highest speed attained during a predetermined period, there is mounted on the housing and extending through the slot an indicator device 180 which extends through the slot 138 and which includes fingers 182 thereon which pull the indicator head 184 frictionally into engagement with the outer surface of the side 124. The fingers and indicator head are joined by a pin 186 which is threaded or otherwise secured to the head 184.

In use, the plate 128 will engage the indicator and move the indicator to the highest speed that the plate attains.

A latitude of modification, substitution and change is intended in the foregoing disclosure and in some instances, some features of the invention will be employed without a corresponding use of other features.

I claim:

1. An air actuated speedometer comprising a housing having an air intake opening and a discharge opening, a plate pivotably mounted in said housing, an arcuate slot in said housing, said plate being visable through said slot and being movable along said slot and between said air intake opening and said discharge opening, and spring means in said housing connected to said plate urging said plate towards said inlet opening, said plate being pivotably mounted at its center of gravity, in said housing, said plate being vertically disposed and having a vertical axis, said spring means including a pair of springs extending normally to said plate and said axis, one of said springs being above said center of gravity and one of said springs being below said center of gravity, and indicia means on said housing cooperating with said plate to provide direct reading of instantaneous speed.

2. An air actuated speedometer according to claim 1, including means extending through said slot and engageable by said plate, said indicating means frictionally engaging said housing for registering the highest speed attained during a predetermined period.

* * * * *